United States Patent [19]

Rawson

[11] Patent Number: 4,867,517
[45] Date of Patent: Sep. 19, 1989

[54] FAIL-SAFE ACOUSTO-OPTIC T-COUPLERS FOR OPTICAL COMMUNICATION NETWORKS

[75] Inventor: Eric G. Rawson, Saratoga, Calif.

[73] Assignee: Xerox Corporation, Stamford, Conn.

[21] Appl. No.: 615,673

[22] Filed: Jun. 1, 1984

Related U.S. Application Data

[63] Continuation of Ser. No. 332,386, Dec. 21, 1981, abandoned.

[51] Int. Cl.$^4$ .................................................. G02B 6/28
[52] U.S. Cl. ................................ 350/96.16; 350/96.18; 350/96.19
[58] Field of Search ................ 350/96.13, 96.15, 96.18, 350/96.19, 96.20, 96.16

[56] References Cited

U.S. PATENT DOCUMENTS

| | | | |
|---|---|---|---|
| 4,086,484 | 4/1978 | Steensma | 250/199 |
| 4,133,612 | 1/1979 | Redman | 356/350 |
| 4,213,677 | 7/1980 | Sugimoto et al. | 350/96.18 |
| 4,289,373 | 9/1981 | Sugimoto et al. | 350/96.16 |
| 4,341,438 | 7/1982 | Seki et al. | 350/96.16 |
| 4,355,864 | 10/1982 | Soref | 350/96.18 |
| 4,384,761 | 5/1983 | Brady et al. | 350/96.20 |

FOREIGN PATENT DOCUMENTS

| | | | |
|---|---|---|---|
| 2731722 | 1/1978 | Fed. Rep. of Germany | 250/199 |
| 2930681 | 2/1981 | Fed. Rep. of Germany | 350/96.19 |
| 100752 | 8/1979 | Japan | 250/96.19 |
| 102136 | 8/1979 | Japan | 350/96.16 |

OTHER PUBLICATIONS

Smith, IBM Tech. Disc. Bull., vol. 14, No. 2, Jul. 1971, "Acoustically Operated Fiber Optic Switch", p. 652.
IBM Technical Disclosure Bulletin, vol. 21, No. 5, Oct. 1978, F. Gfeller et al., "Modulator and Tap for Optical Fiber Systems", pp. 2014–2015.

Primary Examiner—Frank Gonzalez

[57] ABSTRACT

A fail-safe optical T-coupler for coupling a local terminal having at least one light source and at least one photodetector to a segmented optical data bus comprises an optically transparent acousto-optic cell, a pair of collimating lenses for coupling adjacent segments of the data bus to opposite ends of the acoustic-optic cell symmetrically with respect to the optical axis of the coupler so that there is a fail-safe path for transmitting remotely injected light from one segment of the bus to the next, and at least one acoustic driver for coupling acoustic bulk waves into the acousto-optic cell to selectively establish or intensify an ultrasonic grating along an acoustic axis. For interfacing the terminal with the data bus, the collimating lenses couple each light source and of the segments of the data bus to opposite ends of the acousto-optic cell symmetrically with respect to the acoustic axis of the coupler so that the ultrasonic grating Bragg reflects locally injected light from each light source into the data bus. A similar relationship may be maintained between each photodetector and a corresponding segment of the data bus for Bragg reflection of remotely injected light from the data bus segment to the photodetector. Alternatively, the coupler may include a means for passively reflecting remotely injected light to the photodetector or photodetectors.

10 Claims, 9 Drawing Sheets

FAIL-SAFE ACOUSTO-OPTIC T-COUPLERS FOR OPTICAL COMMUNICATION NETWORKS

This is a continuation of application Ser. No. 332,386, filed Dec. 21, 1981 (abandoned).

FIELD OF THE INVENTION

This invention relates to optical communication systems and, more particularly, to acousto-optic couplers for coupling optical radiant energy (hereinafter referred to as "light") into and out of optical communication networks.

BACKGROUND OF THE INVENTION

Fiber optic waveguides are a viable, relatively broad bandwidth alternatives to the coaxial cable transmission lines that are now in widespread use in communication networks. As is known, there are single mode and multi-mode, single fiber and multi-fiber optical waveguides. Single mode fibers have a superior bandwidth/length characteristic, but are difficult to splice and repair because of their relatively small core diameters (typically 2–20 $\mu$m). They may be used to advantage in relatively long haul, high speed communication networks-viz., networks having a length in excess of several km and a data rate higher than about 200 Mbits/sec. Otherwise, however, multi-mode fibers are the optical waveguides of choice because of their greater core diameters (typically 40–400 $\mu$m)

Multi-mode fiber optic bundles (i.e., multi-fiber waveguides) are particularly well suited for relatively short length, low speed communication neworks. The inherently provide redundancy because of their multi-fiber construction and they are resonably easy to efficiently couple to available light sources, such as light emitting diodes (LEDs) and diode lasers, because of their relatively large cross sectional areas. However, they suffer from the disadvantages of (1) having a cost which increases as a function of the number of fibers in the bundle, (2) requiring substantial clearances because of their relatively large cross sectional areas, and (3) often having a relatively large packing injection loss due to the claddings for the several fibers and the inactive areas therebetween. The packing injection losses usually can be reduced to an extent at the expense of increased manufacturing costs, but such costs are frequently difficult to justify. of coupling sufficient light into multi-mode, single strand, fiber optic waveguides for transmission over distances of up to several km without repeatering. Thus, such waveguides have become the preferred optical communications medium for use in most medium to high speed local area networks.

Linear network architectures are becoming increasingly popular, at least in part as a result of the trend toward distributed processing. For example, the Xerox Ethernet local area network has an open loop linear architecture so that terminals (e.g., workstations; shared resources, such as printers and the file servers; and other types of processors) may be added to the network simply by tapping into a coaxial cable communications medium. One of the features of the standard Ethernet network is that fail-safe taps are used so that there is through transmission along the network even if there is a local power failure.

A rugged and reliable optical T-coupler is required for coupling local terminals to single strand, single or multi-mode fiber optic waveguides if such waveguides are to serve as the communications media for linear optical communication networks. Indeed, to provide a full optical counterpart to existing coaxial cable networks, such as the Zerox Ethernet network, a fail-safe coupler is needed. That, of course, rules out optical couplers which rely on active repeaters for through transmission.

Others have proposed fail-safe optical T-couplers which are suitable for coupling local terminals to single strand fiber optic waveguides. The twin T-coupler Ueno and Oogi described at the May 1976 CLEOS Conference in San Diego, Calif. in a paper entitled "Data Highway Using Optical Fiber Cable" is an especially relevant example. In particular, that coupler is configured for coupling local terminals to a dual bus, bidirectional network. To that end, it comprises four SELFOC collimating lenses and a beam splitting prism which are assembled so that each bus is connected to the prism by two of the SELFOCs. Furthermore, in accordance with Ueno and Oogi's teachings, each terminal has a pair of lasers or LED light sources and a pair of photodiodes which are aligned on opposite sides of the beam splitting prism of the associated coupler. Unfortunately, such a coupler does not efficiently couple locally injected light into the buses, even if the light sources are imaged onto the beam splitting prism. It may be adequate for relatively short haul communications over single strand, multi-mode waveguides if relatively high powe, well collimated light sources and relatively sensitive photodetectors are used. Nevertheless, a more efficient coupler is clearly needed. The acousto-optic modulator/coupler shown in U.S. Pat. No. 3,920,982, which issued Nov. 18, 1975 on a "Continuous Fiber Optical Transmit and Receive Termminal," is also of some interest. It relies on bulk acoustic energy for modulating and scattering light guided by a continuous, single or multi-fiber optical waveguide. Otherwise, however, that device is of no particular relevance because it does not have the ability to couple locally injected light into the waveguide.

SUMMARY OF THE INVENTION

In accordance with the present invention, a fail-safe optical T-coupler for coupling a local terminal having at least one light source and at least one photodetector to a segmented optical data bus comprises an optically transparent acousto-optic cell, a pair of collimating lenses for coupling adjacent segments of the data bus to opposite ends of the acoustic-optic cell symmetrically with respect to the optical axis of the coupler so that there is a fail-safe path for transmitting remotely injected light from one segment of the bus to the next, and at least one acoustic driver for coupling acoustic bulk waves into the acousto-optic cell to selectively establish or intensify an ultrasonic grating along an acoustic axis. For interfacing the terminal with the data bus, the collimating lenses couple each light source and the adjacent segments of the data bus to opposite ends of the acousto-optic cell symmetrically with respect to the acoustic axis of the coupler so that the ultrasonic grating Bragg reflects locally injected light from each light source into the data bus. A similar relationship may be maintained between each photodetector and a corresponding segment of the data bus for Bragg reflection of remotely injected light from the data bus segment to the photodetector. Alternatively, the coupler may include a means for passively reflecting remotely injected light to the photodetector or photodetectors.

While the application of the coupler to linear optical networks is emphasized, it will be understood that it may also be used to advantage in ring networks

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1A:
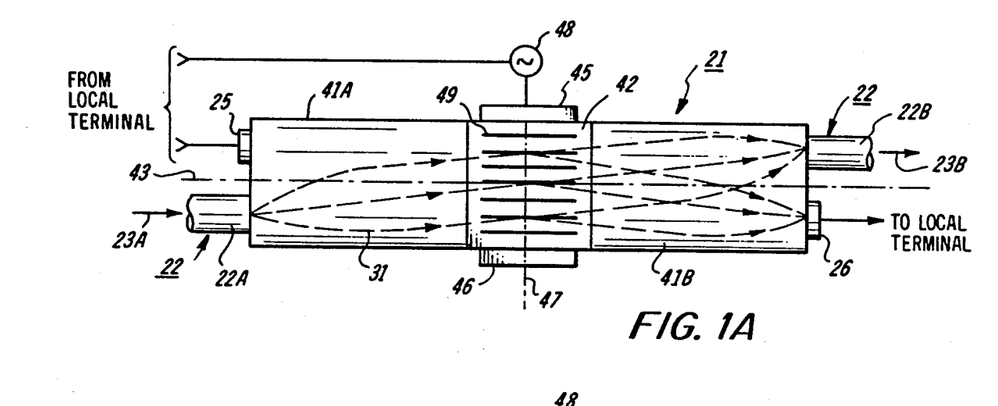
FIGS. 1A and 1B are diagrammatic side views of a fail-safe unidirectional optical T-coupler constructed in accordance with the present invention.
Figure 1B:
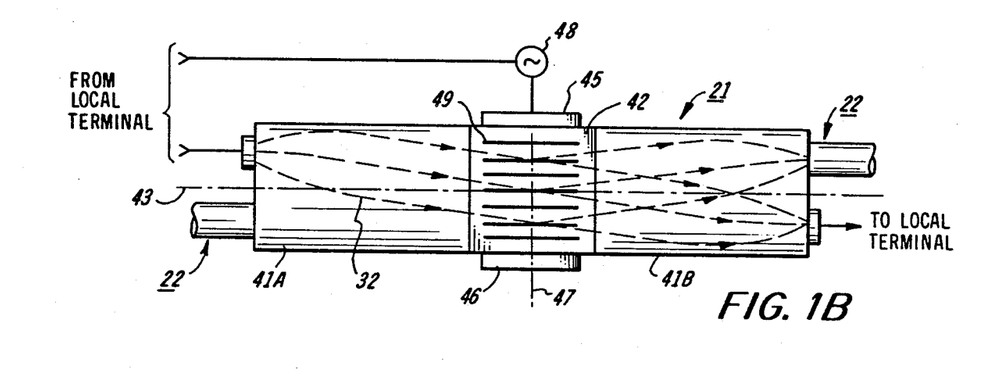

Turning now to the drawings, and at this point especially to FIGS. 1A and 1B, there is a unidirectional optical T-coupler 21 for coupling a local terminal (shown only in relevant part) to a segmented data bus 22 of, say a unidirectional linear or ring-like optical communications network. The bus 22 typically comprises a series of single strand, multimode fiber optic waveguides 22a and 22b, and the network data flow is from the waveguide 22a to the waveguide 22b, as indicated by the arrows 23a and 23b.

For transmitting and receiving data via the bus 22, the local terminal has a suitable light source 25, such as a laser diode or a light emitting diode (LED), and a suitable photodetector 26, such as a photodiode. As will be appreciated, similar provision is made for interfacing each of the other or remote terminals (not shown) to the network data bus 22.

Network communication protocols are beyond the scope of the present invention. Nevertheless, it should be understood that the network conventionally is controlled (by means not shown) so that no more than one terminal is transmitting data over the bus 22 at any given time. Therefore, it may be assumed that data modulated light is injected into the coupler 21 by the light source 25 ("locally injected light") and by one or another of the remote light sources ("remotely injected light") at mutually exclusive times. Moreover, it should be noted that the remotely injected light beam 31 (FIG. 1A) is modulated (by means not shown) in accordance with a predetermined pulse code to transmit data from one of the remote terminals to the local terminal and/or to one or more of the other remote terminals. Likewise, the locally injected light beam 32 (FIG. 1B) is modulated (by means also not shown) in accordance with a suitable pulse code to transmit data from the local terminal to one or more of the remote terminals. As will be appreciated, one of the advantages of the coupler 21 is that the remotely and locally injected light beam 31 and 32 may be modulated at the same frequency, at different frequencies, or even at variable frequencies. Therefore, there are relatively few constraints on the pulse codes that can be accommodated.

In accordance with the present invention, to provide a fail-safe path for transmitting remotely injected light 31 (FIG. 1A) from the waveguide 22a to the waveguide 22b, the coupler 21 comprises a pair of substantially matched collimating lenses 41a and 41b, such as cylindrical self focusing lenses (commonly referred to as SELFOC rods), for coupling the waveguides 22a and 22b, respectively, to opposite ends of an optically transparent acousto-optic cell 42, such as a rectangular block of glass. The SELFOC lenses 41a and 41b and the acousto-optic cell 42 typically have flat, optically polished mating surfaces; and an index matching cement preferably is used to bond the lenses 41a and 41b to the waveguides 22a and 22b, respectively, and to the acousto-optic cell 42.

Figure 10:
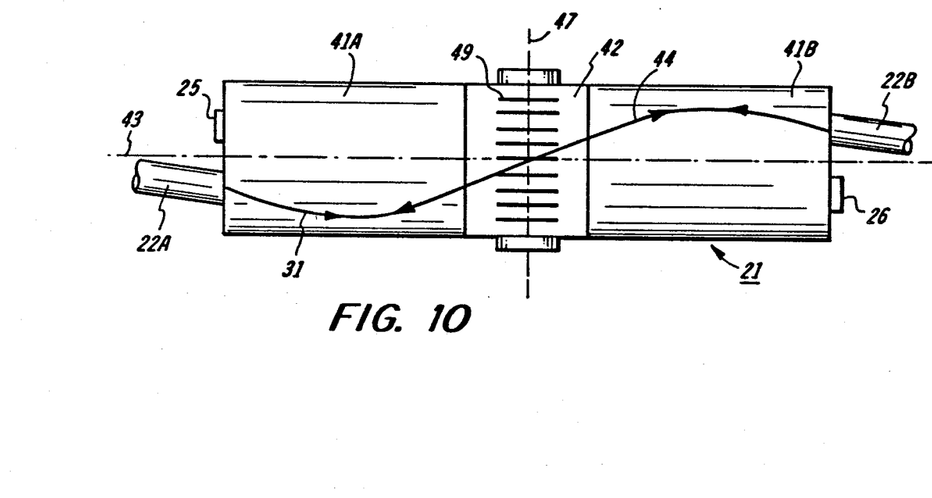
FIG. 10 is a diagrammatic side view illustrating a tilted bus/coupler orientation that may be used to optimize the fail-safe transmission characteristics of couplers embodying this invention.

More particularly, the optical axes of the lenses 41a and 41b are aligned to define a generally linear, longitudinally extending optical axis 43 for the coupler 21. It will be noted that in this embodiment, the waveguides 22a and 22b are attached or otherwise coupled to the lenses 41a and 41b, respectively, in symmetrical laterally offset relationship relative to the optical axis 43. The magnitude of this offset is selected so that the rays of the remotely injected light beam 31, which are substantially collimated in the region of the acousto-optic cell 42, are oriented within the acousto-optic cell 42 at an angle relative to the optical axis 43 substantially equal to the Bragg angle for the ultrasonic grating 49 as more fully discussed hereinbelow. Furthermore, as shown in FIG. 10, the waveguides 22a and 22b may be tilted at appropriate equal but opposite angles relative to the optical axis 43 so that the principal ray 44 of the remotely injected light beam 31 crosses the optical axis 43 midway between the lenses 41a and 41b. As a general rule, however, the longitudinal displacement of point at which the principal ray 44 crosses the optical axis 43 is so slight and of such minor consequence when compared against such an idealized model that such compensation is not required.

For interfacing the local terminal with the coupler 21, the waveguide 22a and the light source 25 are laterally offset from one another and are coupled to one end of the acousto-optic cell 42 by the lens 41a. Also, in this particular embodiment, the waveguide 22b and the photodetector 26 are laterally offset from one another and are coupled to the opposite end of the acousto-optic cell 42 by the lens 41b. Typically, the light source 25 and the photodetector 26 are butt coupled to the lenses 41a and 41b, respectively, in symmetrical laterally offset relationship relative to the optical axis 43 of the coupler 21.

In keeping with this invention, to couple the local terminal to the bus 22, the coupler 21 comprises an acoustic transducer 45 and an acoustic absorber 46 (collectively referred to herein as an acoustic driver) which are mounted on opposite sides of the acousto-optic cell 42 to define a laterally extending acoustic axis 47 for the coupler 21. As shown, the acoustic axis 47 of the coupler 21 is generally orthogonal to its optical axis 43, but that is not an essential relationship.

In operation, the transducer 45 is driven at a predetermined frequency by a suitable source 48 to couple bulk acoustic waves into the acousto-optic cell 42. The acoustic waves travel through the acousto-optic cell 42 along its acoustic axis 47 until they reach the acoustic absorber 46 where they are effectively absorbed so that little, if any, of the acoustic energy is reflected therefrom. Consequently, an ultrasonic grating 49 having a predetermined grating frequency is created along the acoustic axis 47 of the coupler 21.

As will be seen, the local terminal is coupled to the bus 22 by Bragg reflection from the ultrasonic grating 49. Accordingly, there is symmetry about the acoustic axis 47 between the waveguide 22a and the photodetector 26 and between the light source 25 and the waveguide 22b. Moreover, to account for the lateral displacement of the waveguides 22a and 22b from the optical axis 23 of the coupler 21, the photodetector 26 and the light source 25 are displaced from the optical axis 23 in mirror image relationship relative to the waveguides 22a and 22b, respectively.

Considering the bus/terminal interface in some additional detail, it will be noted that the acoustic transducer 45 of this embodiment is driven when the local terminal is operating in either a transmit mode or a receive mode. The source 48 holds the acoustic output power of the transducer 45 at a reliately low level when the local terminal is operating in a receive mode so that the grating 49 Bragg reflects a small percentage (e.g., 1% or so) of any remotely injected light 31 (FIG. 1A) from the waveguide 22a to the photodetector 26 (i.e., a relatively low percentage of the remotely injected light is redirected to the photodetector 26 when the local terminal is operating in a receive mode). Most of the remotely injected light 31 is unaffected by the grating 49 and is, therefore, focused into the waveguide 22b for transmission to remote terminals on the network. Contrastingly, when the local terminal is operating in a transmit mode, the source 48 increases the acoustic output power of the transducer 45, thereby intensifying the grating 49 to maximize the amount of locally injected light 32 (FIG. 1B) that is Bragg reflected from the light source 25 to the waveguide 22b. As will be evident, the local terminal operates in its receive mode under quiescent conditions to monitor the bus 22 and switches into its transmit mode only when it is preparing to transmit data to one or more of the remote terminals.

An example will further illustrate the practical utility of this invention. For purposes of this example it will be assumed that:

(a) The remotely and locally injected light beams 31 and 32 both have a vacuum wavelength, λ, of 8000 Å;

(b) The velocity, v, of sound in the acousto-optic cell 42 is 300 m/sec;

(c) The SELFOC lenses 41a and 41b both have a diameter, d, of 2 mm and a collimator length, 1, of 7.3 mm;

(d) The waveguides 22a and 22b both have a numerical aperture, N.A.; of 0.15; and (e) The waveguides 22a and 22b, the light source 25, and the photodetector 26 are each laterally displaced from the optical axis 23 of the coupler 21 by a distance, x, of 75 μm.

As is known, light reflects from an acoustic sound wave if the light is incident on the sound wave at the so-called Bragg Angle, $\phi_B$, which may be calculated from the equation:

$$\sin \theta_B = \frac{\lambda_o}{2n\Omega} \quad (1)$$

where:
$\lambda_o$ = the vacuum wavelength of the light;
n = the refractive index of the medium carrying the acoustic wave; and
$\Omega$ = the wavelength of the acoustic wave or sound in such medium.

In the coupler 21, the angle at which the remotely and locally injected light beams 31 and 32 are incident on the ultrasonic grating 49 is determined by the angle, $\phi$, which the waveguide 22a and the light source 25 subtend within the acousto-optic cell 42. That angle is given by:

$$\theta = \frac{x}{f} \quad (2)$$

where: f = the internal focal length of the SELFOC lens 41a. By definition:

$$f = \frac{21}{\pi} \quad (3)$$

Using the foregoing assumptions to solve equations (2) and (3) by substitution, it is found that the lens 41a has an internal focal length, F, of about 4.65 mm and that the remotely and locally injected light beams 31 and 32 are incident on the grating 49 at an angle, $\phi$, of approximately 0.016 radians or 0.924 degrees. Now, if the Bragg angle, $\phi_B$, is assumed to be equal to the angle of incidence, $\phi$, equation (1) can be rewritten to determine the frequency, F, at which the transducer 45 should be driven to cause the light beams 31 and 32 to Bragg reflect from the grating 49:

$$F = \frac{\theta \cdot v}{\lambda} \quad (4)$$

where:
$\phi$ = the angle of incidence of the light beams 32 and 32 as measured in radians.

Equation (4), in turn, can be solved by substitution to show that the appropriate drive frequency for the transducer 45 is roughly 60 mHz. Furthermore, given the numerical aperture, N.A., of the waveguides 22a and 22b, it can be shown that the remotely injected light beam 31 has a diameter of approximately 0.88 mm within the acousto-optic cell 42, which means that the 2 mm diameter of the SELFOC lenses 41a and 41b is ample to accomodate the expansion of the light beam 31.

Additional embodiments of the invention are described hereinbelow using similar reference characters to identify like parts. Unique alphabetic suffixes have been added to certain of the reference characters to highlight the functional differences between the several embodiments, but new reference have been introduced only to the extent necessary to identify functionally unique parts.

Figure 2:
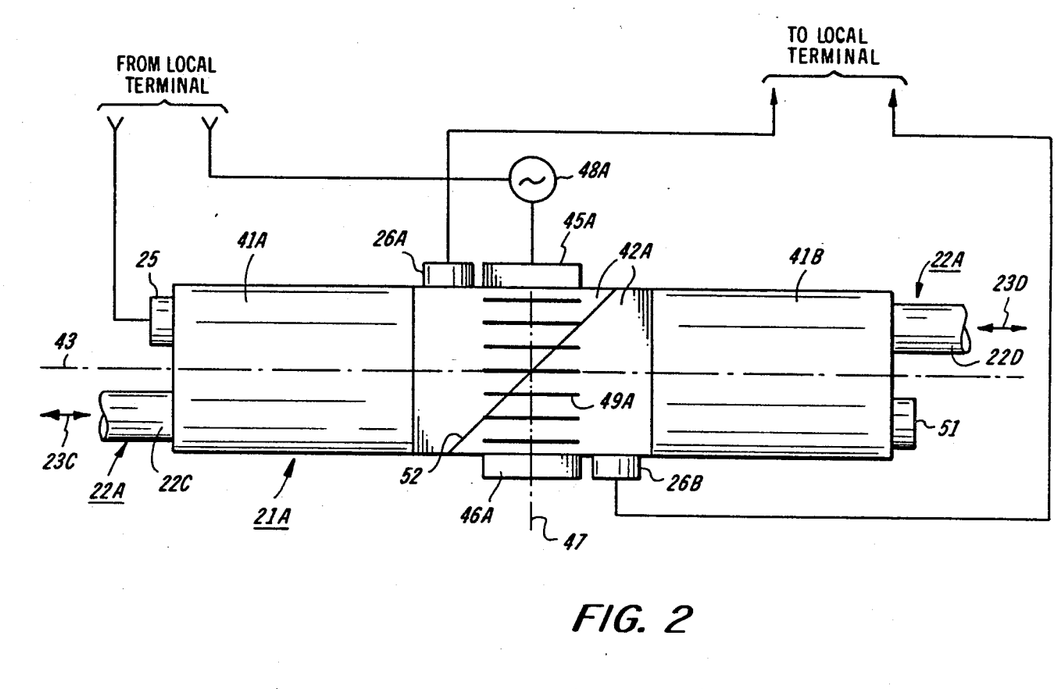
FIG. 2 is a diagrammatic side view of a single source/single driver, fail-safe bidirectional optical T-coupler embodying this invention.

Referring to FIG. 2, there is a bidirectional coupler 21a which is characterized by having a mirror 51 bonded or otherwise coupled to the SELFOC lens 41b in place of the photodetector 26 (FIGS. 1A and 1B). A beam splitter 52 is included in the coupler 21a so that a small percentage of any remotely injected light received via the waveguides 22c or 22d is passively reflected to a photodetector 26a or to a photodetector 26b, respectively. To form the beam splitter 52, the acousto-optic cell 42a is conveniently assembled from two parts which have been severed at an appropriate angle so that a weakly relective optical coating may be applied to one of their internal mating surfaces. Thus, the photodetectors 26a and 26b are shown as being mounted on opposite sides of the acousto-optic cell 42a. In view of the passive reflection provided by the beam splitter 52, the acoustic transducer 45a is driven by the source 48a only when the local terminal is operating in a transmit mode. The photodetectors 26a and 26b are, of course, electrically coupled in parallel, and the waveguides 22c or 22d are segments of a bidirectional data bus 22A, as indicated by the arrows 23c and 23d.

Focusing for a moment on the operation of the coupler 21a, it will be evident that the mirror 51 couples the light source 25 to the waveguide 22c when the local terminal is operating in a transmit mode. Specifically, locally injected light which is not Bragg reflected into the waveguide 22d by the ultrasonic grating 49a is reflected from the mirror 51 and is, therefore, available for Bragg reflection into the waveguide 22c.

Figure 3:
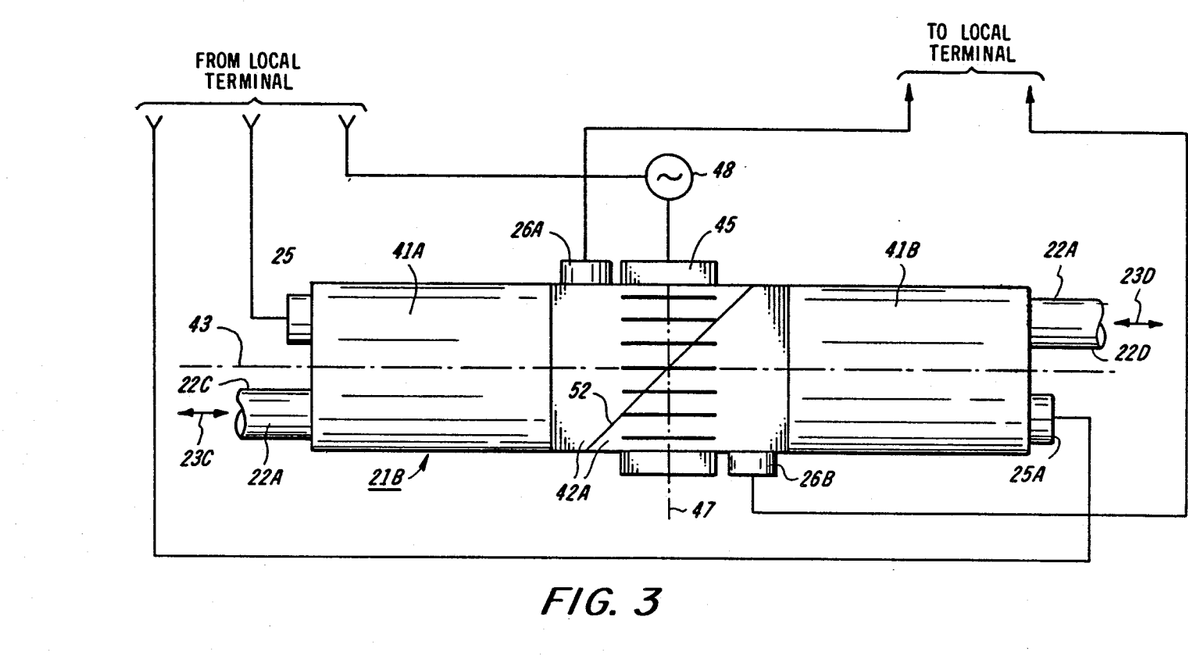
FIG. 3 is a diagrammatic side view of a dual source, single driver alternative to the bidirectional coupler shown in FIG. 2.
Figure 4:
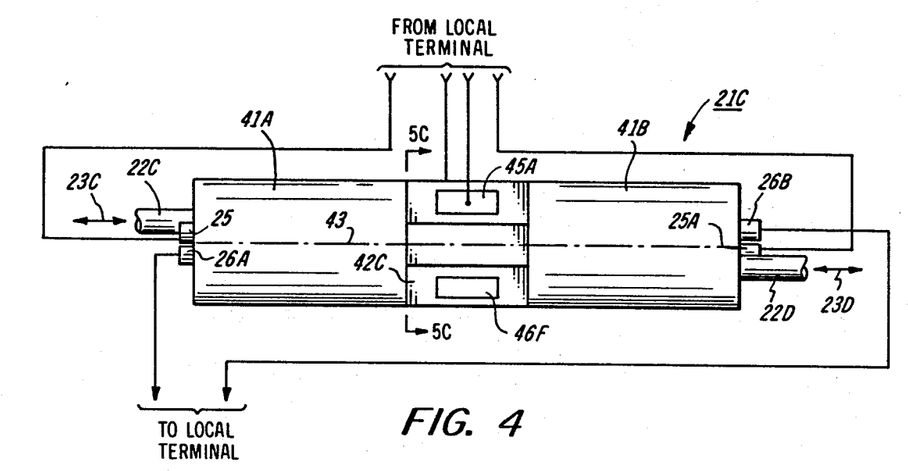
FIG. 4 is a diagrammatic side view of a dual source/dual driver bidirectional coupler constructed in accordance with this invention.
Figures 5A, 5B, 5C:
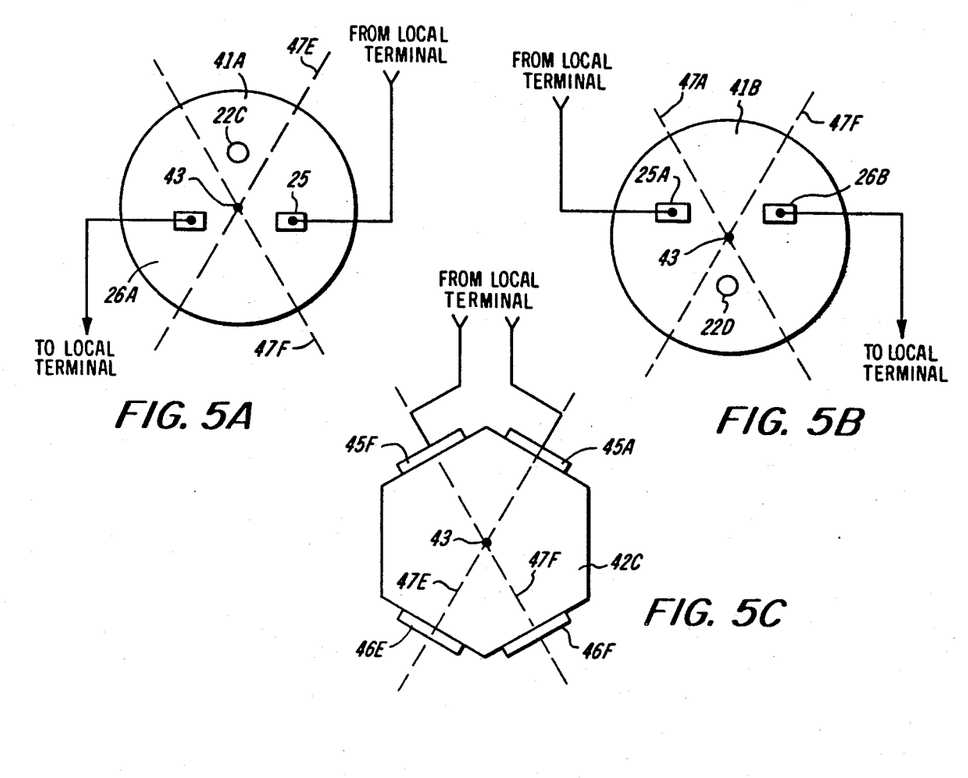
FIGS. 5A and 5B are enlarged left hand and right hand end views, respectively, of the coupler shown in FIG. 4.
FIGS. 5C is a sectional view of the coupler shown in FIG. 4 which is taken along the line 5C—5C in FIG. 4 looking in the direction of the arrows.

Turning to FIG. 3, a bidirectional coupler 21b having a better balanced coupling characteristic for transmitting data from the local terminal may be provided by replacing the mirror 51 with a second light source 25a. Preferably, the light sources 25 and 25a are driven in parallel.

Alternatively, as shown in FIGS. 4 and 5A-5C, a bidirectional coupler 21c may be constructed by bonding or otherwise coupling the waveguides 22c and 22d, the light sources 25 and 25a, and the photodetectors 26a and 26b to the outer faces of the collimating lenses 41a and 41b, respectively, on 120 degree centers. The waveguides 22c and 22d, and light sources 25 and 25a, and the photodetectors 26a and 26b are all laterally displaced from the optical axis 43 of the coupler 21c, but there is symmetry about that axis between the waveguides 22c and 22d to allow for fail-safe through transmission of remotely injected light. As will be appreciated, the orientation of the waveguides 22c and 22d, the light sources 25 and 25a, and the photodetectors 26a and 26b on 120 degree centers simplifies the fabrication of the coupler 21c, but other center displacement angles could be used without departing from this invention. Moreover, while the waveguides 22c and 22d, the light sources 25 and 25a, and the photodetectors 26a and 26b are illustrated as being well spaced from the optical axis 43 of the coupler 21c, it will be understood that those elements preferably are packed as close as possible around the axis 43 to minimize optical wavefront abberations which tend to detract from the coupling efficiency.

To carry out this invention, the coupler 21c has a pair of acoustic transducers 45e and 45f and a pair of acoustic absorbers 46e and 46f. The transducers 45e and 45f are mounted on the acousto-optic cell 42c symmetrically with respect to the waveguides 22c and 22d on centers which are displaced from one another by 60 degrees (assuming that the waveguides 22c and 22d, the light sources 25 and 25a, and the photodetectors 26a and 26b are on 120 degree centers as previously described). The acoustic absorbers 46e and 46f, on the other hand, are mounted on the acousto-optic cell 42c in opposing relationship to the transducers 45e and 45f, respectively (i.e., on centers which are displaced from the centers of the transducers 45e and 45f, respectively, by 180 degrees). Thus, the coupler 21c has a pair of acoustic axes 47e and 47f which (1) are displaced from one another by 60 degrees, (2) are symmetrical with respect to the waveguides 22c and 22d and (3) intersect with one another on the optical axis 43. Suitably, to simplify the mounting of the transducers 45e and 45f and the absorbers 46e and 46f, the acousto-optic cell 42c has a hexagonal sectional profile.

Briefly reviewing the operation of the coupler 21c, it will be seen that there is symmetry about the acoustic axis 47e between the waveguide 22c and the photodetector 26b and between the waveguide 22d and the photodetector 26a. Thus, when the local terminal is operating in a a receive mode, the transducer 45e is energized to create a relatively weak ultrasonic grating along the axis 47e so that a small percentage of any remotely injected light is Bragg reflected from the waveguides 22c and 22d to the photodetectors 26f and 26e respectively. Likewise, there is symmetry about the acoustic axis 47f between the waveguide 22c and the light source 25a and between the waveguide 22d and the light source 25. Accordingly, when the local terminal is operating in a transmit mode, the other transducer 45f is energized to create a relatively intense ultrasonic grating along the axis 47f, whereby locally injected light is Bragg reflected from the light sources 25a and 25 to the waveguides 22c and 22d, respectively. Of course, if neither of the transducers 45e or 45f is energized, the waveguides 22c and 22d are simply imaged onto to each other for fail-safe through transmission of any remotely injected light.

Figure 6:
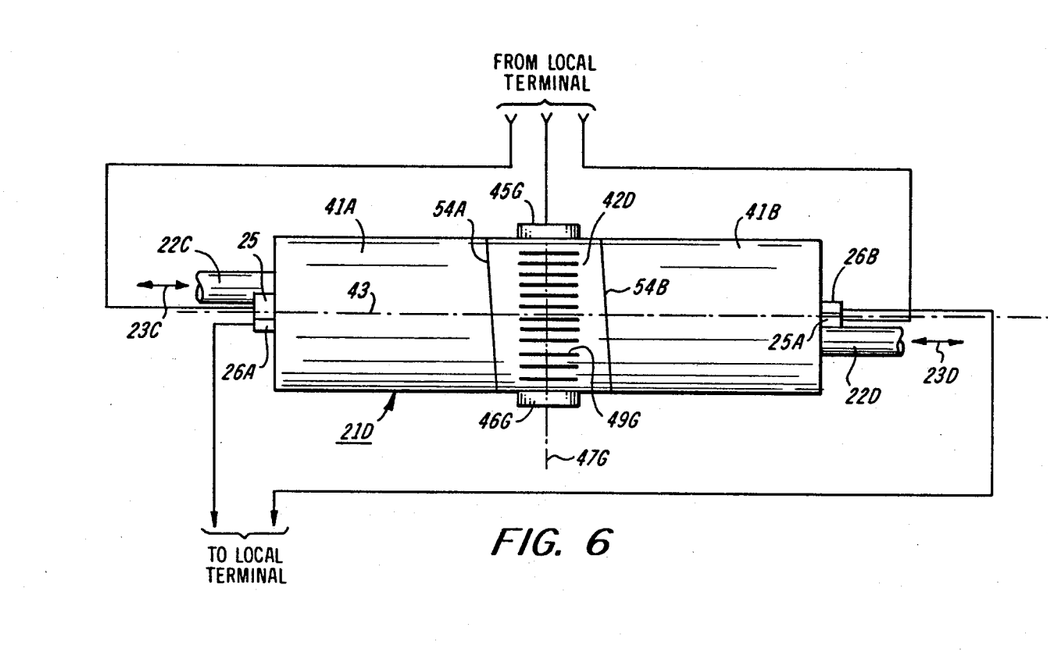
FIG. 6 is a diagrammatic side view of dual source/single driver alternative to the bidirectional coupler shown in FIG. 4.
Figure 7A:
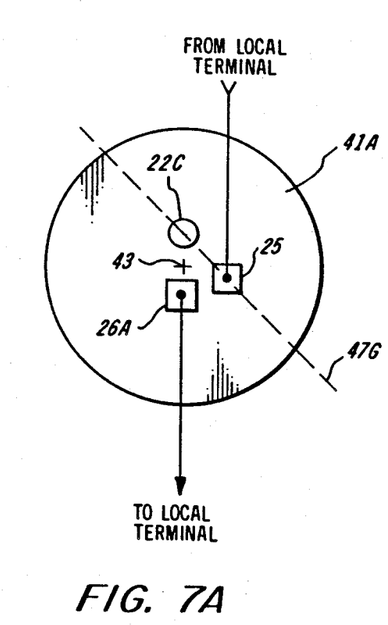
FIGS. 7A and 7B are opposite end views of one implementation of the coupler shown in FIG. 6.
Figure 7B:
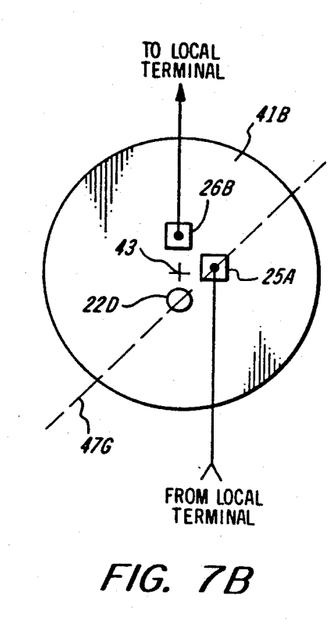
Figures 8A, 8B:
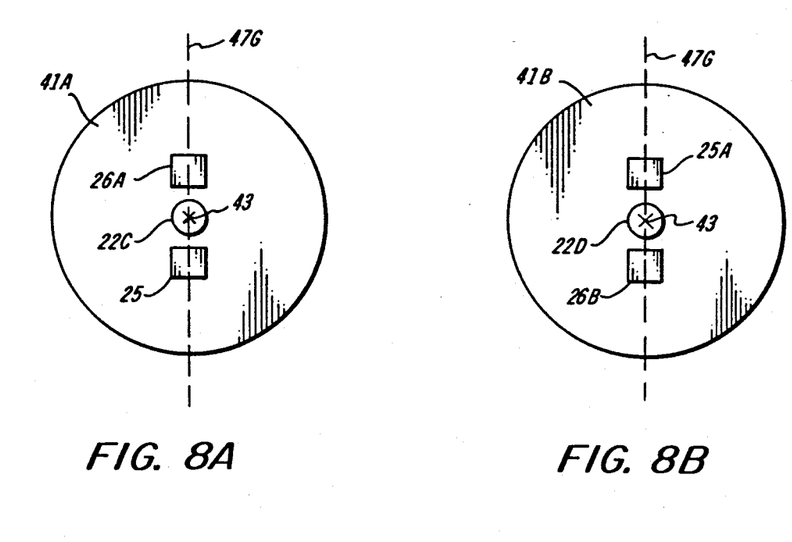
FIGS. 8A and 8B are opposite end views of another implementation of the coupler shown in FIG. 6.
Figure 9A:
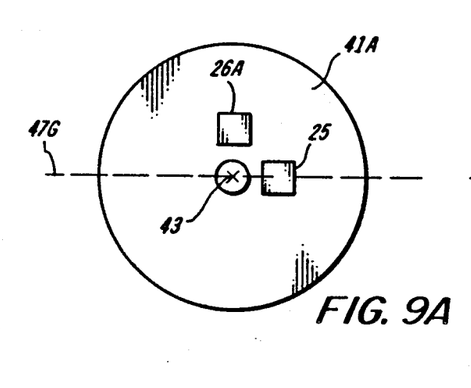
FIGS. 9A and 9B are opposite end views of still another implementation of the coupler shown in FIG. 6.
Figure 9B:
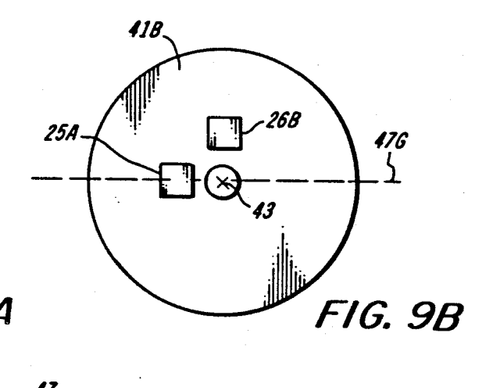

Turning to FIG. 6, there is a bidirectional coupler 21d which has end mounted light sources 25 and 25a and photodetectors 26a and 26b like the coupler 21c, but which requires only one acoustic transducer 45g and one acoustic absorbers 46g (i.e., a single acoustic driver). To obviate the need for the second acoustic driver, the coupler 21d includes means for passively reflecting or redirecting a relatively small percentage of any remotely injected light from the waveguide 22c to the photodetector 26a and from the waveguide 22d to the photodetector 26b. For example, the opposite ends 54a and 54b of the acousto-optic cell 42d may be cut at an appropriate angle and coated with a weakly reflective coating to couple the waveguides 22c and 22d to the photodetectors 26a and 26b, respectively. FIGS. 7A-7B. 8A-8B, and 9A-9B illustrate specific implementations of the concept underlying the single driver bidirectional coupler of FIG. 6.

More particularly, if the ends 54a and 54b of the acousto-optic cell 42d are cut perpendicularly to the optical axis 43 of the coupler 21d, there must be symmetry, as shown in FIGS. 7A-7B, about the optical axis 43 between the waveguide 22c and the photodetectors 26a and between the waveguide 22d and the photodetectors 26b. Alternatively, however, the ends 54a and 54b of the acousto-optic cell 42d may be beveled to accomodate assymetrical relationships as shown in FIGS. 8A-8B and 9A-9B. In any event, the waveguides 22c and 22d are symmetrically displaced from the optica axis 43 (FIGS. 7A-7B) or are coaxial therewith (FIGS. 8A-8B and FIGS. 9A-9B) so that there is fail-safe transmission of any remotely injected light. Furthermore, in all of those embodiments, there is symmetry about the acoustic axis 47g between the light source 25 and the waveguide 22d and between the light source 25a and the waveguide 22c. Thus, the ultrasonic grating 49g, which the transducer 45g creates within the acousto-optic cell 42d when the local terminal is operating in a transmit mode, Bragg reflects the locally injected light supplied by the light sources 25 and 25a into the waveguides 22d and 22c, respectively, as previously described.

While the tilted waveguide/coupler interface of FIG. 10 is illustrated with specific reference to the unidirectional coupler 21, it will be understood that it may be used to provide compensation for the finite width of the acousto-optic cell 42, as measured along the optical axis 43, in any of the above described bidirectional couplers if desired.

CONCLUSION

In view of the foregoing, it will now be understood that the present invention provides improved unidirectional and bidirectional, fail-safe optical T-couplers for coupling terminals to linear and ring-like optical communication networks, including networks having buses formed of single strand, single or multi-mode fiber optic waveguides.

What is claimed is:

1. A fail-safe optical T-coupler for coupling a local terminal having at least one light source and at least one photodetector to a segmented optical data bus, said coupler comprising:
   an optically transparent acousto-optic cell;
   first and second collimating lenses for coupling adjacent segments of said data bus to opposite ends of said acousto-optic cell, said lenses defining a generally linear optical axis for said coupler, and said data bus segments being coupled to said acousto-optic cell symmetrically with respect to said optical axis, thereby providing a fail-safe path for transmitting remotely injected light from one to another of said data bus segments;
   means for coupling relatively high power bulk acoustic waves into said acousto-optic cell when said terminal is operating in a transmit mode, thereby creating an ultrasonic grating within said cell along an acoustic axis;
   said light source and a first of said data bus segments being coupled to said acousto-optic cell symmetrically with respect to said acoustic axis, whereby a relatively high percentage of locally injected light is Bragg reflected from said light source to a least said first data bus segment when said terminal is operating in said transmit mode;
   said photodetector being optically coupled to acousto-optic cell; and
   means for redirecting a relatively low percentage of said remotely injected light to said photodetector when said terminal is operating in a receive mode, said means for redirecting including means for coupling lower power bulk acoustic waves into said acousto-optic cell when said terminal is operating in said receive mode, thereby creating a relatively weak ultrasonic grating within said cell for Bragg reflecting remotely injected light from at least one of said data bus segments to said photodetector when said terminal is operating in said receive mode:
   said coupler being characterized in that
   said Bragg reflection of said remotely and locally injected light occurs from ultrasonic gratings created along different acostic axes,
   said light source and said first data bus segment are coupled to said acousto-optic cell symmetrically with respect to a first of said acoustic axes, whereby locally injected light is Bragg reflected from said light source to at least said first data bus segment when said terminal is operating in said transmit mode, and
   said one data bus segment and said photodetector are coupled to said acousto-optic cell symmetrically with respect to a second of said acoustic axes, whereby remotely injected light is Bragg reflected from at least said one data bus segment to said photodetector when said terminal is operating in said receive mode.

2. The coupler of claim 1 wherein
   said terminal has a pair of light sources and a pair of photodetectors,
   a first of said light sources, a first of said photodetectors, and one of said data bus segments are on approximately 120° centers and are coupled to one end of said acousto-optic cell by said first lens,
   the second of said light sources, the second of said photodetectors, and the other of said data bus segments are on approximately 120° centers and are coupled to the opposite end of said acousto-optic cell by said second lens,
   there is symmetry about said first acoustic axis between said first light source and said other data bus segment and between said second light source and said one data bus segment for bidirectional transmission from said terminal, and
   there is symmetry about said second acoustic axis between said first photodetector and said other data bus segment and between said second photodetector and said one data bus segment for bidirectional reception by said terminal.

3. The coupler of claim 2 wherein
   said means for coupling acoustic bulk waves into said cell comprises first and second acoustic transducers and first and second acoustic absorbers,
   said first and second acoustic axes are displaced from one another by approximately 60°,
   said first transducer and said first absorber are mounted in opposing relationship on said acoustic-optic cell in alignment with said first acoustic axes to create one of said ultrasonic gratings for Bragg reflecting locally injected light from said first light source to said other data bus segment and from second light-source to said one data bus segment when said terminal is operating in said transmit mode, and
   said second transducer and said second absorber are mounted in opposing relationship on said acoustic-optic cell in alignment with said second acoustic axes to create another of said ultrasonic gratings for Bragg reflecting remotely injected light from said other data bus segment to said first photodetector and from said one data bus segment to said second photodetector when said terminal is operating in said receive mode.

4. The coupler of claim 3 wherein
said first and second lenses are matching SELFOC rods.

5. A fail-safe optical T-coupler for coupling a local terminal having at least one light source and at least one photodetector to a segmented optical data bus, said coupler comprising:

an optically transparent acousto-optic cell;

first and second collimating lenses for coupling adjacent segments of said data bus to opposite ends of said acousto-optic cell, said lenses defining a generally linear optical axis for said coupler, said data bus segments being coupled to said acousto-optic cell symmetrically with respect to said optical axis, thereby providing a fail-safe path for transmitting remotely injected light from one to another of said data bus segments;

means for coupling bulk acoustic waves into said acousto-optic cell when said terminal is operating in a transmit mode, thereby creating an ultrasonic grating within said cell along an acoustic axis;

said light source and a first of said data bus segments being coupled to said acousto-optic cell symmetrically with respect to said acoustic axis, whereby a relatively high percentage of locally injected light is Bragg reflected from said light source to at least said first data bus segment when said terminal is operating in said transmit mode;

said photodetector being optically coupled to acousto-optic cell; and means for redirecting a relatively low percentage of said remotely injected light to said photodetector when said terminal is operating in a receive mode:

characterized in that said terminal has a pair of light sources and a pair of photodetectors, said first and second lenses couple said light sources and said data bus segments to the opposite ends of said acousto-optic cell symmetrically with respect to said acoustic axis, whereby said ultrasonic grating Bragg reflects locally injected light from one and the other of said light sources to one and the other of said data bus segments, respectively, when said terminal is operating in said transmit mode, and said coupler includes means for passively redirecting a portion of said remotely injected light from one and the other of said data bus segments to one and the other of said photodetectors, respectively, when said terminal is operating in said receive mode.

6. The coupler of claim 5 wherein
said photodetectors are mounted on opposite sides of said coupler, and
said means for redirecting includes a beam splitter interposed between said first and second lenses for reflecting remotely injected light to said photodetectors.

7. The coupler of claim 6 wherein
said first and second lenses are matching SELFOC rods.

8. A coupler of claim 5 wherein
said photodetectors are coupled by said first and second lenses, respectively, to said opposite ends of said acousto-optic cell, and
said means for redirecting includes partially reflective optical coatings on said opposite ends of said acousto-optic cell for reflecting remotely injected light to said photodetectors.

9. The coupler of claim 8 wherein
said first and second lenses are matching SELFOC rods.

10. A fail-safe optical T-coupler for coupling a local terminal having at least one light source and at least one photodetector to a segmented optical data bus, said coupler comprising:

an optically transparent acousto-optic cell;

first and second collimating lenses for coupling adjacent segments of said data bus to opposite ends of said acousto-optic cell, said lenses defining a generally linear optical axis for said coupler, and said data bus segments being coupled to said acousto-optic cell symmetrically with respect to said optical axis, thereby providing a fail-safe path for transmitting remotely injected light from one to another of said data bus segments;

means for coupling bulk acoustic waves into said acousto-optic cell when said terminal is operating in a transmit mode, thereby creating an ultrasonic grating within said cell along an acoustic axis;

said light source and a first of said data bus segments being coupled to said acousto-optic cell symmetrically with respect to said acoustic axis, whereby a relatively high percentage of locally injected light is Bragg reflected from said light source to at least said first data bus segment when said terminal is operating in said transmit mode;

said photodetector being optically coupled to acousto-optic cell; and passive means interposed in said fail-safe path for redirecting a relatively low percentage of said remotely injected light to said photodetector when said terminal is operating in a receive mode.

* * * * *